(12) United States Patent
Takazoe et al.

(10) Patent No.: US 10,764,275 B2
(45) Date of Patent: Sep. 1, 2020

(54) CONTROLLER, COMMUNICATION METHOD, AND COMMUNICATION SYSTEM

(71) Applicant: PANASONIC INTELLECTUAL PROPERTY MANAGEMENT CO., LTD., Osaka (JP)

(72) Inventors: Tomoki Takazoe, Kanagawa (JP); Yoichi Masuda, Tokyo (JP); Hideki Matsushima, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 15/753,148

(22) PCT Filed: Aug. 4, 2016

(86) PCT No.: PCT/JP2016/003595
§ 371 (c)(1),
(2) Date: Feb. 15, 2018

(87) PCT Pub. No.: WO2017/038009
PCT Pub. Date: Mar. 9, 2017

(65) Prior Publication Data
US 2018/0241739 A1    Aug. 23, 2018

(30) Foreign Application Priority Data
Aug. 31, 2015 (JP) .................................. 2015-170760

(51) Int. Cl.
*G06F 7/04* (2006.01)
*G06F 15/16* (2006.01)
(Continued)

(52) U.S. Cl.
CPC .......... *H04L 63/0823* (2013.01); *G06F 21/44* (2013.01); *G06F 21/445* (2013.01);
(Continued)

(58) Field of Classification Search
None
See application file for complete search history.

(56) References Cited

U.S. PATENT DOCUMENTS

2006/0150241 A1* 7/2006 Huh .................... H04L 63/0823
726/4
2006/0182042 A1* 8/2006 Nasu ....................... H04L 41/28
370/254

(Continued)

FOREIGN PATENT DOCUMENTS

| CN | 103051608 A | 4/2013 |
| JP | 2004-247799 A | 9/2004 |
| JP | 2014-217073 A | 11/2014 |

OTHER PUBLICATIONS

IETF: "RFC 5246—The Transport Layer Security (TLS) Protocol Version 1.2", Aug. 31, 2008 (Aug. 31, 2008), XP055469140, Retrieved from the Internet: URL:https://tools.ietf.org/html/rfc5246.

(Continued)

*Primary Examiner* — Phy Anh T Vu
(74) *Attorney, Agent, or Firm* — McDermott Will & Emery LLP

(57) ABSTRACT

A new controller (supporting device authentication) is a controller which performs encrypted communication with a device which has succeeded in mutual authentication using an electronic certificate, and the controller includes: a determining unit that determines whether or not a communication target device with which communication is to be performed is an authentication support device that supports the mutual authentication; a functional restriction unit that, when the (Continued)

communication target device is determined not to be the authentication support device by the determining unit, imposes a functional restriction on one or more functions of the communication target device which are operable by the new controller (supporting device authentication); and a communication unit which performs communication in plain text with the communication target device with the functional restriction imposed by the functional restriction unit.

9 Claims, 13 Drawing Sheets

(51) Int. Cl.
    *H04L 29/06*    (2006.01)
    *H04L 9/08*    (2006.01)
    *H04L 9/14*    (2006.01)
    *H04L 9/32*    (2006.01)
    *G06F 21/44*    (2013.01)

(52) U.S. Cl.
    CPC .................. *H04L 9/08* (2013.01); *H04L 9/14* (2013.01); *H04L 9/32* (2013.01); *H04L 9/3263* (2013.01); *H04L 63/0869* (2013.01); *H04L 63/0876* (2013.01); *H04L 63/102* (2013.01)

(56) References Cited

U.S. PATENT DOCUMENTS

| | | | |
|---|---|---|---|
| 2012/0144464 A1 | 6/2012 | Fakhrai et al. | |
| 2015/0295721 A1* | 10/2015 | Unagami | G06F 21/44 713/158 |
| 2016/0234628 A1* | 8/2016 | Rahman | H04L 12/2809 |
| 2017/0006030 A1* | 1/2017 | Krishnamoorthy | H04L 9/3263 |
| 2017/0048280 A1* | 2/2017 | Logue | H04W 12/003 |

OTHER PUBLICATIONS

Extended European Search Report issued in European Application No. 16841051.2 dated Jun. 13, 2018.

Chinese Office Action including Search Report issued in corresponding Chinese Patent Application No. 201680049899.3, dated Mar. 31, 2020, with partial translation.

International Search Report and Written Opinion issued in International Patent Application No. PCT/JP2016/003595, dated Sep. 20, 2016; with partial English translation.

Communication issued in related EP Patent Application No. 16841051. 2, dated Feb. 7, 2019.

* cited by examiner

| DEVICE ID | CERTIFICATE ID | SHARED KEY | GROUP KEY | SESSION KEY | REMAINING TIME OF SESSION |
|---|---|---|---|---|---|
| D1 | P1 | 01234… | 11223… | 11122… | 13:40:50 |
| D2 | P2 | 98765… | | 22233… | 13:41:24 |
| D3 | P3 | 19283… | | 33344… | 16:02:13 |
| … | … | … | | … | … |

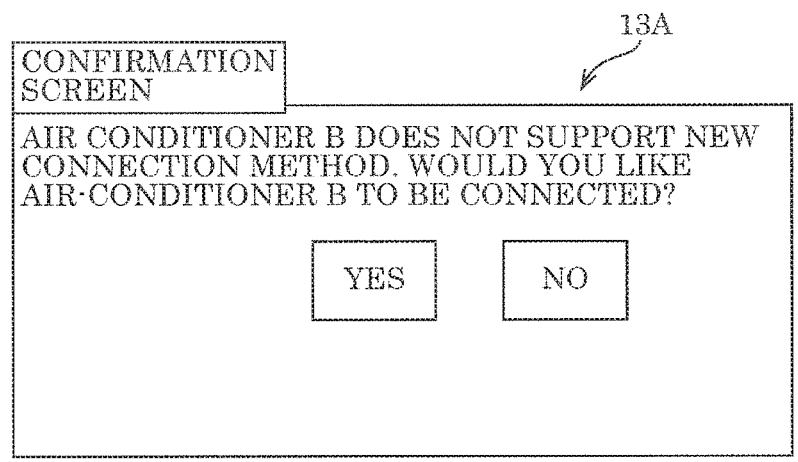

FIG. 17

| SECURITY LEVEL / DEVICE | 3 (DEVICE AUTHENTICATION SUPPORTED) NO FUNCTIONAL RESTRICTION | 2 (AIF SUPPORTED) PARTIAL FUNCTIONAL RESTRICTION IMPOSED | 1 (LEGACY DEVICE) FUNCTIONAL RESTRICTION IMPOSED |
|---|---|---|---|
| AIR CONDITIONER | ① OPERATING STATE AND SETTING INFORMATION ARE OBTAINABLE<br>② TEMPERATURE IS SETTABLE<br>③ ON/OFF OF POWER SUPPLY IS POSSIBLE | ① OPERATING STATE AND SETTING INFORMATION ARE OBTAINABLE<br>② TEMPERATURE IS SETTABLE<br>③ ON/OFF OF POWER SUPPLY IS NOT POSSIBLE | ① OPERATING STATE AND SETTING INFORMATION ARE OBTAINABLE<br>② TEMPERATURE IS NOT SETTABLE<br>③ ON/OFF OF POWER SUPPLY IS NOT POSSIBLE |
| STORAGE BATTERY | ① OPERATING STATE AND SETTING INFORMATION ARE OBTAINABLE<br>② ELECTRIC ENERGY INFORMATION IS OBTAINABLE<br>③ OPERATION MODE IS SETTABLE (QUICK CHARGE/ CHARGE/ DISCHARGE/ STANDBY/ TEST/ AUTOMATIC/ OTHERS) | ① OPERATING STATE AND SETTING INFORMATION ARE OBTAINABLE<br>② ELECTRIC ENERGY INFORMATION IS OBTAINABLE<br>③ OPERATION MODE IS NOT SETTABLE (QUICK CHARGE/ CHARGE/ DISCHARGE/ STANDBY/ TEST/ AUTOMATIC/ OTHERS) | ① OPERATING STATE AND SETTING INFORMATION ARE OBTAINABLE<br>② ELECTRIC ENERGY INFORMATION IS NOT OBTAINABLE<br>③ OPERATION MODE IS NOT SETTABLE (QUICK CHARGE/ CHARGE/ DISCHARGE/ STANDBY/ TEST/ AUTOMATIC/ OTHERS) |
| SOLAR POWER GENERATION | ① OPERATING STATE AND SETTING INFORMATION ARE OBTAINABLE<br>② INSTANTANEOUS GENERATED ELECTRIC ENERGY MEASUREMENT VALUE IS OBTAINABLE<br>③ INTEGRATED GENERATED ELECTRIC ENERGY MEASUREMENT VALUE IS OBTAINABLE | ① OPERATING STATE AND SETTING INFORMATION ARE OBTAINABLE<br>② INSTANTANEOUS GENERATED ELECTRIC ENERGY MEASUREMENT VALUE IS OBTAINABLE<br>③ INTEGRATED GENERATED ELECTRIC ENERGY MEASUREMENT VALUE IS NOT OBTAINABLE | ① OPERATING STATE AND SETTING INFORMATION ARE OBTAINABLE<br>② INSTANTANEOUS GENERATED ELECTRIC ENERGY MEASUREMENT VALUE IS NOT OBTAINABLE<br>③ INTEGRATED GENERATED ELECTRIC ENERGY MEASUREMENT VALUE IS NOT OBTAINABLE |
| INSTANTANEOUS WATER HEATER | ① OPERATING STATE AND SETTING INFORMATION ARE OBTAINABLE<br>② BATH AUTOMATIC MODE IS SETTABLE | ① OPERATING STATE AND SETTING INFORMATION ARE OBTAINABLE<br>② BATH AUTOMATIC MODE IS NOT SETTABLE | ① OPERATING STATE AND SETTING INFORMATION ARE OBTAINABLE<br>② BATH AUTOMATIC MODE IS NOT SETTABLE |

125

CONTROLLER, COMMUNICATION METHOD, AND COMMUNICATION SYSTEM

RELATED APPLICATIONS

This application is the U.S. National Phase under 35 U.S.C. § 371 of International Patent Application No. PCT/JP2016/003595, filed on Aug. 4, 2016, which in turn claims the benefit of Japanese Application No. 2015-170760, filed on Aug. 31, 2015, the entire disclosures of which Applications are incorporated by reference herein.

TECHNICAL FIELD

The present invention relates to a controller, a communication method, and a communication system that perform encrypted communication with a device which has succeeded in mutual authentication using an electronic certificate.

BACKGROUND ART

In recent years, in some cases, a controller is connected to a home area network, and communication between a device and an external server is performed via the controller (for instance, see PTL1). Thus, it is necessary to control in-home communication by safely setting the connection between the controller and each device, and to prevent impersonation connection by an unauthorized device or information leakage by interception of the content of communication.

For instance, in an authentication system in which devices perform mutual authentication using a public key certificate (electronic certificate) issued by a certification authority, a technique is known, in which at the time of first registration, the devices generate a shared key using the public key certificate, and subsequent authentication is simplified using the shared key (for instance, see PTL2).

CITATION LIST

Patent Literature

PTL1: Japanese Unexamined Patent Application Publication No. 2014-217073
PTL2: Japanese Unexamined Patent Application Publication No. 2004-247799

SUMMARY OF THE INVENTION

Technical Problems

However, in practical operational environment, devices that support and devices that do not support the above-described mutual authentication (hereinafter referred to as "device authentication") using an electronic certificate are mixed. Even in such an environment, it is desirable that the devices not supporting the device authentication be safely operated.

In view of the above-mentioned problem, it is an object of the present invention to provide a controller, a communication method, and a communication system that, even in an environment where devices supporting the device authentication and devices not supporting the device authentication are mixed, are capable of safely operating the devices not supporting the device authentication.

Solution to Problems

In order to achieve the above-mentioned object, as a summary, a controller according to first aspect of the present invention performs encrypted communication with a device which has succeeded in mutual authentication using an electronic certificate, the controller including: a determining unit which determines whether or not a communication target device with which communication is to be performed is an authentication support device that supports the mutual authentication; a functional restriction unit which, when the communication target device is determined not to be the authentication support device by the determining unit, imposes a functional restriction on one or more functions of the communication target device which are operable by the controller; and a communication unit which performs communication in plain text with the communication target device with the functional restriction imposed by the functional restriction unit.

As a summary, a communication method according to second aspect of the present invention is performed by a controller when the controller performs encrypted communication with a device which has succeeded in mutual authentication using an electronic certificate, the method including: determining by the controller whether or not a communication target device with which communication is to be performed is an authentication support device that supports the mutual authentication; when the communication target device is determined not to be the authentication support device in the determining by the controller, imposing a functional restriction on one or more functions of the communication target device which are operable by the controller; and performing communication in plain text with the communication target device with the functional restriction in the imposing.

As a summary, a communication system according to third aspect of the present invention includes a controller which performs encrypted communication with a device which has succeeded in mutual authentication using an electronic certificate, the controller including: a determining unit which determines whether or not a communication target device with which communication is to be performed is an authentication support device that supports the mutual authentication; a functional restriction unit which, when the communication target device is determined not to be the authentication support device by the determining unit, imposes a functional restriction on one or more functions of the communication target device which are operable by the controller; and a communication unit which performs communication in plain text with the communication target device with the functional restriction imposed by the functional restriction unit.

Advantageous Effect of Invention

According to the present invention, it is possible to provide a controller, a communication method, and a communication system that, even in an environment where devices supporting the device authentication and devices not supporting the device authentication are mixed, are capable of safely operating the devices not supporting the device authentication.

BRIEF DESCRIPTION OF DRAWINGS

FIG. 15 is a diagram illustrating a screen example displayed on a display of the new controller (supporting the device authentication) included in the communication system according to the embodiment of the present invention.

FIG. 16 is a diagram illustrating another screen example displayed on a display of the new controller (supporting the device authentication) included in the communication system according to the embodiment of the present invention.

FIG. 17 is a diagram illustrating an example of functional restriction information stored in a memory of the new controller (supporting the device authentication) included in the communication system according to the

DESCRIPTION OF EXEMPLARY EMBODIMENT

Hereinafter, a controller and the like according to this embodiment will be described with reference to the drawings. Each of the embodiments described below is a preferable example of the present invention. Therefore, the numerical values, shapes, materials, components, arrangement positions and connection topologies of the components, processes (steps), the order of the processes which are shown in the following embodiments are examples, and not intended to limit the present invention. Thus, those components in the following embodiments, which are not stated in the independent claim that defines the most generic concept are each described as an arbitrary component. It is to be noted that the respective figures are schematic diagrams and are not necessarily precise illustrations.

In the following description of the drawings, the same or similar components are labeled with the same or similar symbol, and a redundant description may be omitted.

Embodiment

Basic Configuration

A communication system according to this embodiment is predicated on the authentication system described below.

Authentication System

Figure 1:
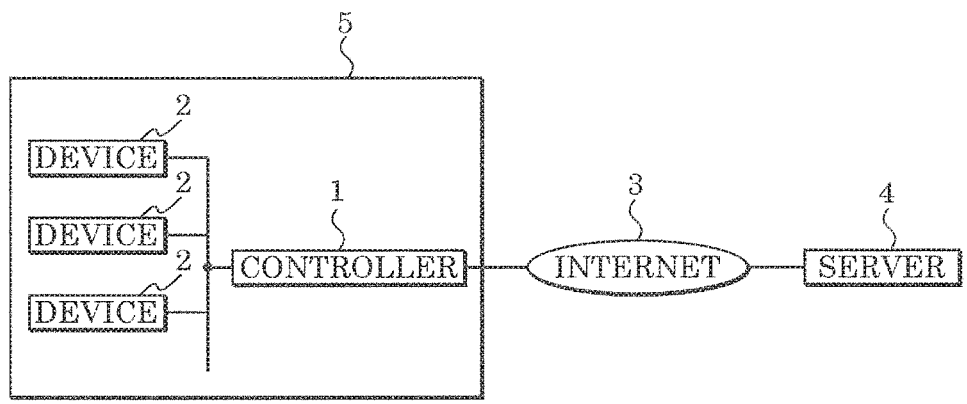
FIG. 1 is a block diagram illustrating the fundamental configuration of an authentication system according to an embodiment of the present invention.

As illustrated in FIG. 1, the authentication system according to this embodiment includes controller 1, multiple devices 2, and server 4 communicably connected to controller 1 via internet 3 which is a communication line. Server 4 is a certification authority that issues a public key certificate to controller 1 and multiple devices 2, and manages the issued public key certificate.

Controller 1 (first device) is a controller in a home energy management system (HEMS) that manages the consumed electric energy, surplus generated electric energy of multiple devices 2, for instance. Controller 1 is a communication device that is communicably connected to multiple devices 2. Controller 1 performs mutual authentication with multiple devices 2, and registers multiple devices 2, thereby forming HEMS 5 with multiple devices 2.

Figure 2:
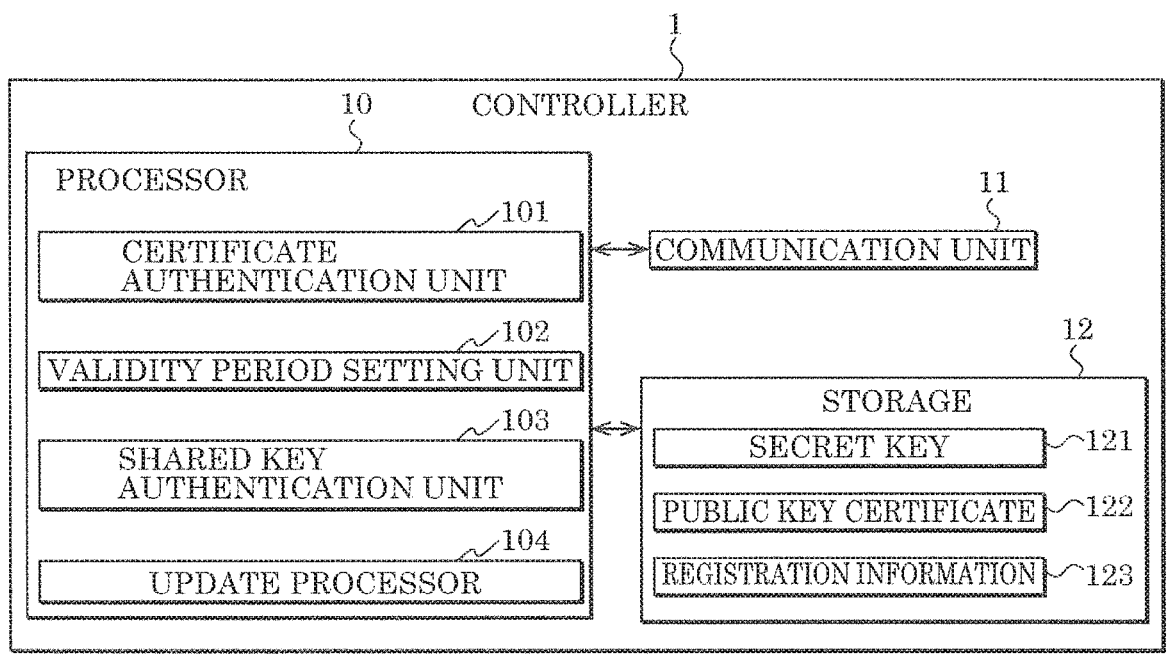
FIG. 2 is a block diagram illustrating the fundamental configuration of a controller included in the authentication system according to the embodiment of the present invention.

As illustrated in FIG. 2, controller 1 includes processor 10, communication unit 11 that communicates with others according to the control of processor 10, and memory 12 that stores information on programs and various data. The communication performed by communication unit 11 may be wireless communication or may be wired communication. Memory 12 stores secret key 121 of controller 1 itself and public key certificate 122, and registration information 123 that is information on device 2 already registered.

Figures 3, 4:
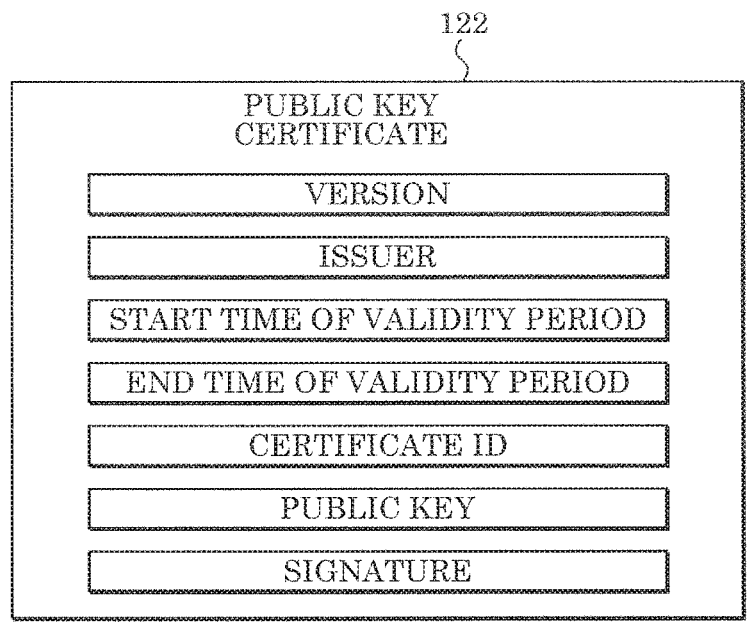
FIG. 3 is a block diagram illustrating the fundamental data structure of a public key certificate used in the authentication system according to the embodiment of the present invention.
FIG. 4 is a block diagram illustrating the fundamental data structure of registration information used in the authentication system according to the embodiment of the present invention.

As illustrated in FIG. 3, public key certificate 122 includes the version of public key certificate 122, an issuer, the start time of a validity period, the end time (valid deadline) of a validity period, a certificate ID (identifier), a public key of controller 1, and the signature of server 4. The public key of public key certificate 122 corresponds to secret key 121. The signature of public key certificate 122 is created using the secret key of server 4. Public key certificate 122 is issued by server 4, and is stored in memory 12 when controller 1 is manufactured.

As illustrated in FIG. 4, registration information 123 includes a device ID that identifies each of devices 2 already registered, a certificate ID that identifies public key certificate 222 (see FIG. 6) of each device 2, a shared key (shared key in advance), a group key, a session key, and a remaining time of session. The shared key is shared between controller 1 and each of devices 2. The group key is used for encryption and decryption of information collectively transmitted to devices 2 by controller 1. Device 2 belonging to the same group shares the same group key with controller 1. The session key is used for encryption and decryption of unicast communication between controller 1 and devices 2. The remaining time of a session is the remaining time which is set between controller 1 and each device 2, and during which the session is valid.

Processor 10 has certificate authentication unit 101, validity period setting unit 102, shared key authentication unit 103, and update processor 104 as a logical structure. Processor 10 includes of a processing device, such as a central processing unit (CPU).

Certificate authentication unit 101 performs mutual authentication with device 2 using public key certificate 122 and public key certificate 222 of device 2 to be authenticated, thereby generating a shared key to be shared with device 2. Valid period setting unit 102 sets the validity period of either one of public key certificate 122 and public key certificate 222 to the shared key generated by certificate authentication unit 101.

When the validity period set in the shared key has not expired, shared key authentication unit 103 performs mutual authentication with device 2 not using public key certificate 122 and public key certificate 222, but using the shared key generated by certificate authentication unit 101. When the validity period set in the shared key has expired, update process part 104 updates public key certificate 122 to new public key certificate 122.

Device 2 (second device) includes, for instance, a load device such as an air conditioner, and a refrigerator, an illuminating device, a power supply device such as a solar battery, and a storage battery, and a smart meter. Device 2 is a communication device that joins HEMS 5 by being registered in controller 1, and performs encrypted communication with controller 1. Device 2 may be a device equivalent to controller 1 that has a control function, a management function, and the like. When multiple devices have the management function are present in the same network, only the device connected first renders the management function and a device subsequently connected does not render the management function.

Figures 5, 6:
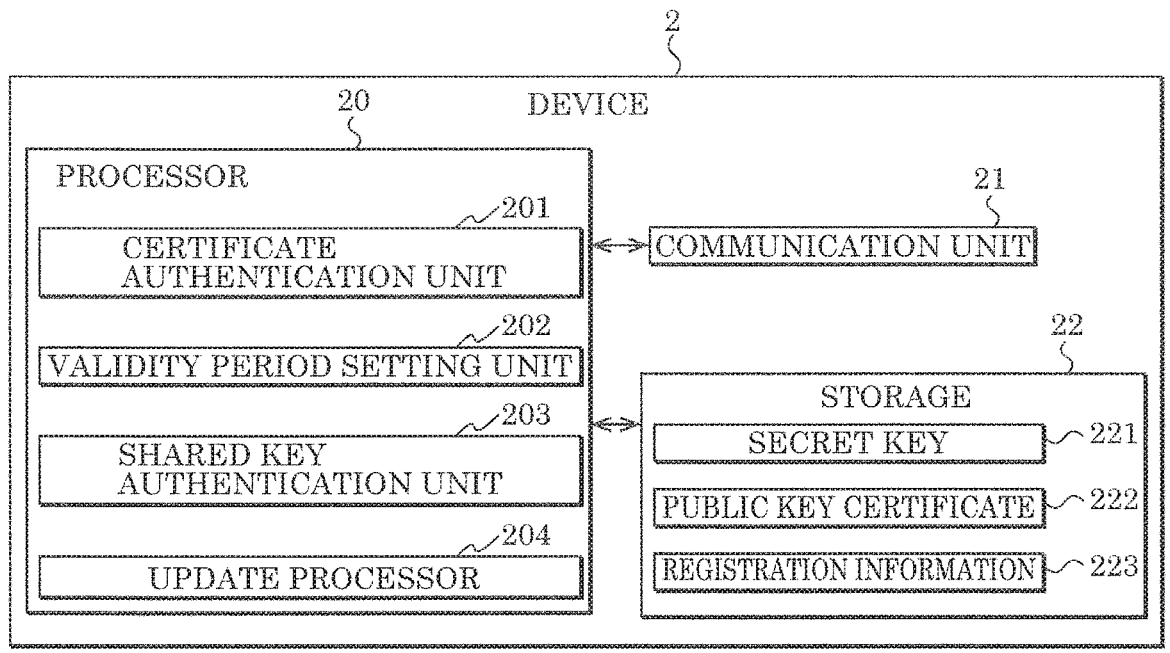
FIG. 5 is a block diagram illustrating the fundamental configuration of a device included in the authentication system according to the embodiment of the present invention.
FIG. 6 is a block diagram illustrating the fundamental data structure of registration information used in the authentication system according to the embodiment of the present invention.

As illustrated in FIG. 5, each device 2 includes processor 20, communication unit 21 that communicates with controller 1 according to the control of processor 20, and memory 22 that stores programs and various data. The communication performed by communication unit 21 may be wireless communication or may be wired communication. Memory 22 stores secret key 221 and public key certificate 222 of device 2 itself, and registration information 223 that is information on controller 1 in which device 2 itself is registered.

Similarly to public key certificate 122, public key certificate 222 includes the version of public key certificate 222, an issuer, the start time of a validity period, the end time (valid deadline) of a validity period, a certificate ID, a public key of device 2, and the signature of server 4. The public key of public key certificate 222 corresponds to secret key 221. The signature of public key certificate 222 is created using the secret key of server 4. Public key certificate 222 is issued by server 4, and is stored in memory 22 when device 2 is manufactured.

As illustrated in FIG. 6, registration information 223 includes a controller ID that identifies controller 1 in which device 2 itself is registered, a certificate ID that identifies public key certificate 122 of controller 1, a shared key, a group key, a session key, and the remaining time of session. The shared key is shared between controller 1 and each device 2. The group key is used for encryption and decryption of information collectively transmitted to devices 2 by controller 1. The session key is used for encryption and decryption of unicast communication with controller 1. The remaining time of a session is the remaining time that is set between and device 2 and controller 1, and during which the session is valid.

Processor 20 has certificate authentication unit 201, validity period setting unit 202, shared key authentication unit 203, and update processor 204 as a logical structure. Processor 20 includes of a processing device such as a CPU.

Certificate authentication unit 201 performs mutual authentication with controller 1 using public key certificate 222 and public key certificate 122 of controller 1 which is to be authenticated, thereby generating a shared key shared with controller 1. Valid period setting unit 202 sets the validity period of either one of public key certificate 222 and public key certificate 122 to a shared key generated by certificate authentication unit 201.

When the validity period set in the shared key has not expired, shared key authentication unit 203 performs mutual authentication with device 2 not using public key certificate 222 and public key certificate 122, but using the shared key generated by certificate authentication unit 201. When the validity period set in the shared key has expired, update process part 204 updates public key certificate 222 to new public key certificate 222.

Authentication Method

Figure 7:
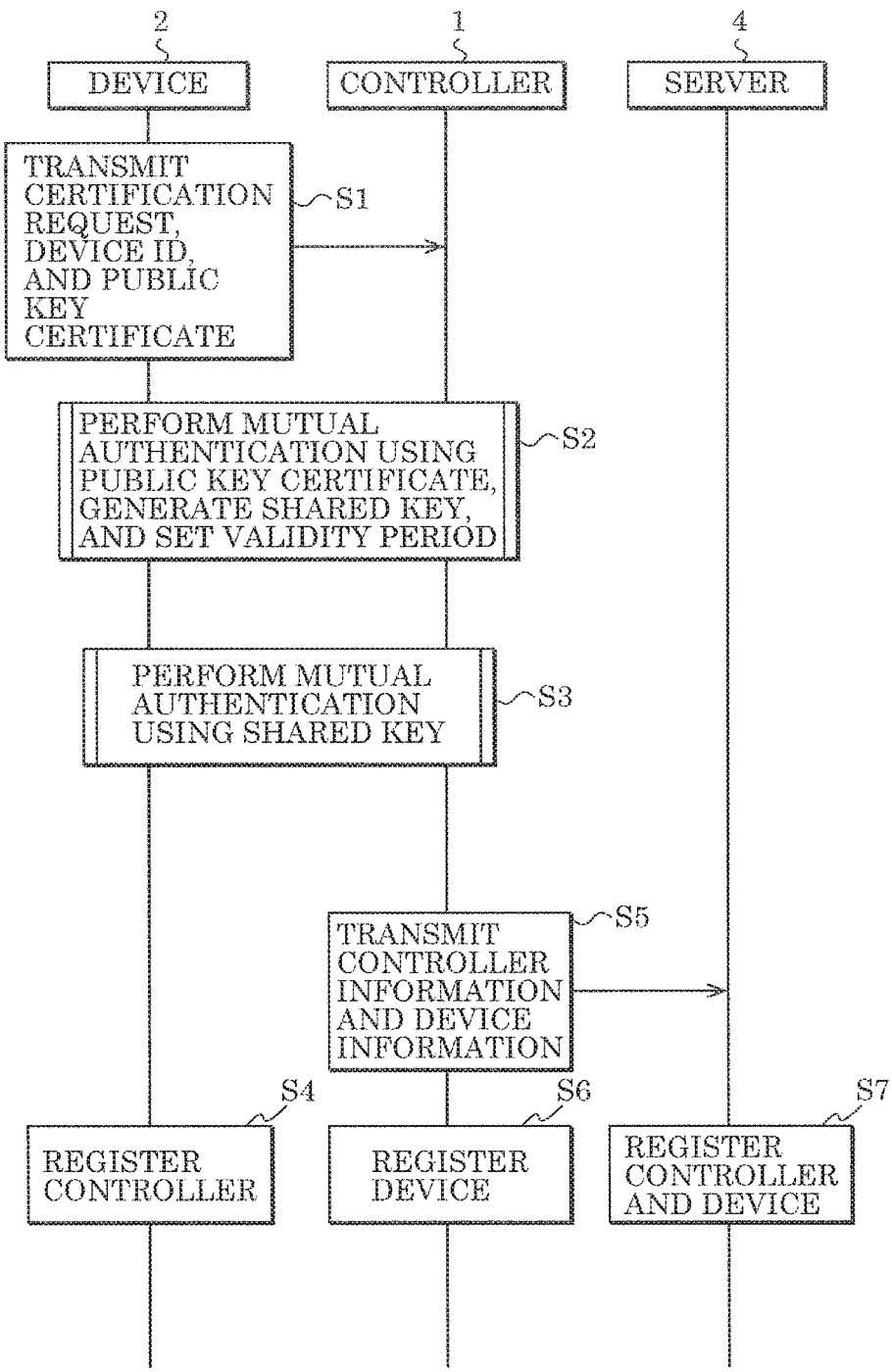
FIG. 7 is a sequence diagram illustrating the operation of the authentication system according to the embodiment of the present invention.

An authentication method by an authentication system according to this embodiment will be described with reference to the sequence diagram of FIG. 7.

First, in step S1, certificate authentication unit 201 of device 2 transmits an authentication request for requesting authentication using a public key certificate, and device ID of itself and public key certificate 222 to controller 1 via communication unit 21. Communication unit 11 of controller 1 receives the authentication request, device ID, and public key certificate 222 transmitted from device 2 in step S1.

In step S2, certificate authentication unit 101 of controller 1 performs mutual authentication using certificate authentication unit 201, public key certificate 122, and public key certificate 222 according to the authentication request obtained via communication unit 11. The mutual authentication in step S2 is mutual authentication based on the public key infrastructure (PKI).

Certificate authentication unit 101 and certificate authentication unit 201 check the validity of each public key certificate, and when mutual authentication is successful, generate a shared key by the key exchange method. Valid period setting unit 102 and validity period setting unit 202 sets the validity period of either one of public key certificate 122 and public key certificate 222 to the shared key shared by controller 1 and device 2 by certificate authentication unit 101 and certificate authentication unit 201. It is to be noted that when the mutual authentication using the public key certificate is failed, certificate authentication unit 101 and certificate authentication unit 201 complete the processing.

In step S3, when the validity period set in the shared key shared by controller 1 and device 2 has not expired, shared key authentication unit 103 and shared key authentication unit 203 perform mutual authentication using the shared key without using public key certificate 122 and public key certificate 222. Shared key authentication unit 103 and shared key authentication unit 203 check the validity of each shared key, and when mutual authentication is successful, sets a group key, a session key, and a session validity period as necessary. When the mutual authentication using the shared key is failed, shared key authentication unit 103 and shared key authentication unit 203 complete the processing.

In step S4, shared key authentication unit 203 registers the shared key, the set group key, the session key and the session validity period as registration information 223 in association with the controller ID of controller 1 and certificate ID of public key certificate 122.

In step S5, shared key authentication unit 103 transmits the controller ID of controller 1, certificate ID of public key certificate 122, device ID of device 2, and certificate ID of public key certificate 222 to server 4 via communication unit 11. At this point, communication unit 11 performs SSL (Secure Socket Layer) communication with server 4.

In step S6, shared key authentication unit 103 registers the shared key, the set group key, the session key, and the session validity period as registration information 223 in association with the device of device 2, and certificate ID of public key certificate 222.

In step S7, server 4 receives the controller ID of controller 1, certificate ID of public key certificate 122, device ID of device 2, and certificate ID of public key certificate 222 that have been transmitted in step S5, and registers device 2 and controller 1 as the authenticated communication devices. It is to be noted that the operation in step S5 and step S7 may be omitted.

Mutual Authentication Using Public Key Certificate

Figure 8:
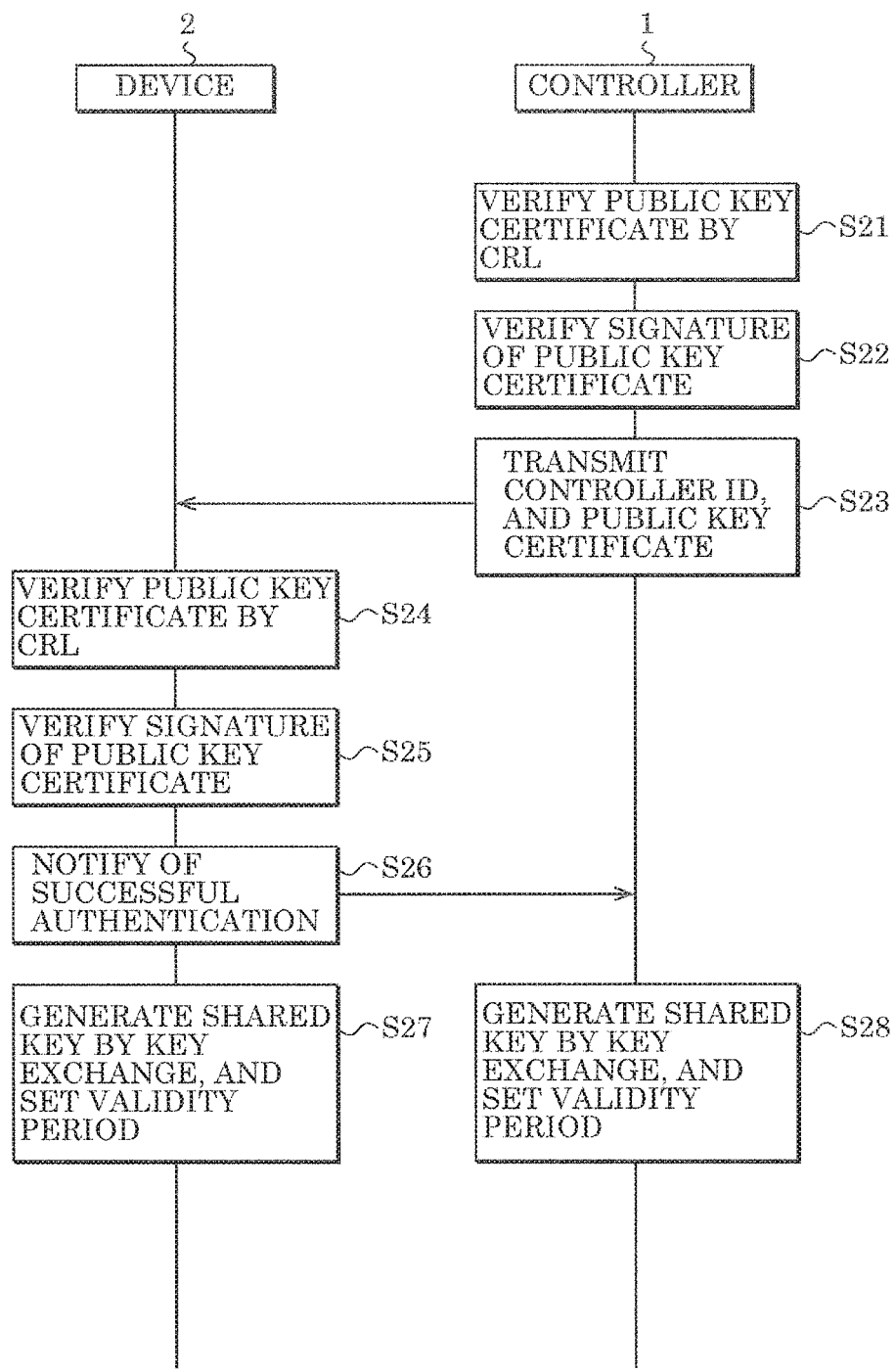
FIG. 8 is a sequence diagram illustrating the processing of mutual authentication using a public key certificate in the authentication system according to the embodiment of the present invention.

An example of processing of mutual authentication using a public key certificate in step S2 of the sequence diagram of FIG. 7 will be described with reference to the sequence diagram of FIG. 8.

In step S21, certificate authentication unit 101 verifies the validity of public key certificate 222 transmitted from device 2 by a certificate revocation list (CRL). In addition, certificate authentication unit 101 verifies the validity period of public key certificate 222. When public key certificate 222 is verified as valid, certificate authentication unit 101 proceeds the processing to step S22, and when public key certificate 222 is determined to be revoked, certificate authentication unit 101 completes the processing.

In step S22, certificate authentication unit 101 verifies the signature of public key certificate 222 using the public key of server 4. When the signature of public key certificate 222 is verified as valid, certificate authentication unit 101 proceeds the processing to step S23, and when the signature is determined to be revoked, certificate authentication unit 101 completes the processing.

In step S23, certificate authentication unit 101 transmits the controller ID of controller 1 and public key certificate 122 to device 2 which has transmitted the authentication request via communication unit 11. Certificate authentication unit 201 of device 2 obtains the controller ID and public key certificate 122 via communication unit 21 transmitted from controller 1.

In step S24, certificate authentication unit 201 verifies the validity of public key certificate 122 by the CRL, and validity period. When public key certificate 222 is verified as valid, certificate authentication unit 201 proceeds the processing to step S25, and when public key certificate 222 is determined to be revoked, certificate authentication unit 201 completes the processing.

In step S25, certificate authentication unit 201 verifies the signature of public key certificate 122 using the public key of server 4. When the signature of public key certificate 122 is verified as valid, certificate authentication unit 201 proceeds the processing to step S26, and when the signature is determined to be revoked, certificate authentication unit 201 completes the processing.

In step S26, certificate authentication unit 201 transmits to controller 1 a notification of success for notifying that verification of public key certificate 122 is successful. It is to be noted that the electronic signature method and the verification method in step S21 to step S26 are based on the elliptic curve digital signature algorithm (ECDSA).

In step S27 and step S28, certificate authentication unit 101 and certificate authentication unit 201 generate a shared key by the key exchange method. The key exchange method can be the elliptic curve Diffie-Hellman key exchange (ECDH) method. Also, the shared key is assumed to use a key length of 128 bits of the advanced encryption standard (AES), and a hash value is calculated from the shared value, and the upper 128 bits of the calculated hash value can be the shared key.

Valid period setting unit 102 and validity period setting unit 202 set the validity period of either one of public key certificate 122 and public key certificate 222 to the shared key generated by certificate authentication unit 101 and certificate authentication unit 201. Validity period setting unit 102 and validity period setting unit 202 set, for instance, the shorter one of the validity periods of public key certificate 122 and public key certificate 222 as the validity period of the shared key. Memory 12 and memory 22 store the shared key and the validity period set in the shared key in association with each other.

Mutual Authentication Using Shared Key

Figure 9:
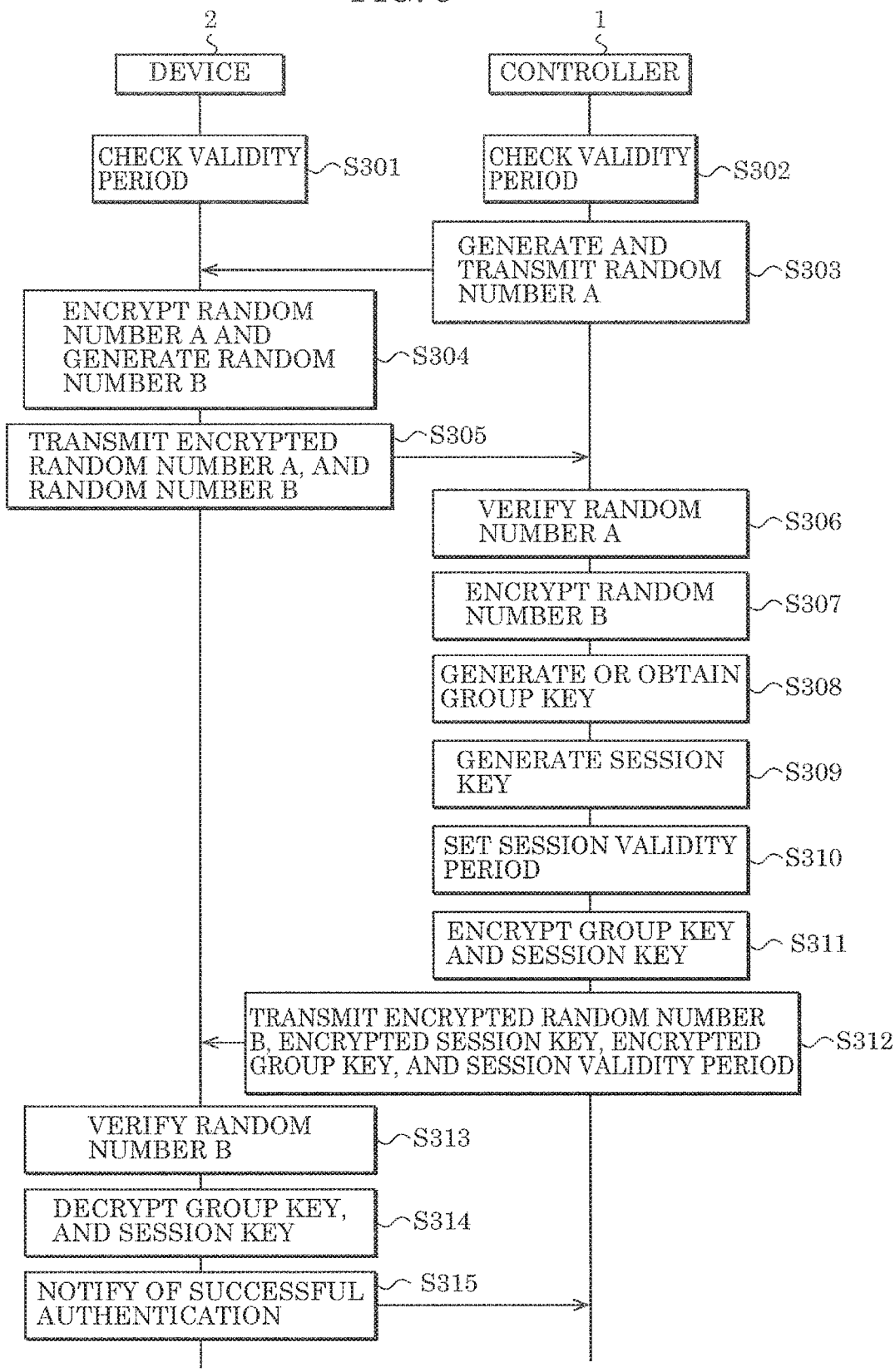
FIG. 9 is a sequence diagram illustrating the processing of mutual authentication using a shared key in the authentication system according to the embodiment of the present invention.

An example of processing of mutual authentication using the shared key in step S3 of the sequence diagram of FIG. 7 will be described with reference to the sequence diagram of FIG. 9. The mutual authentication using a shared key is performed by the challenge response authentication method.

In step S301 and step S302, shared key authentication unit 103 and shared key authentication unit 203 check the validity period set in the shared key. The validity period is checked at a predetermined timing. The validity period may be checked at the time of update of a session of communication between controller 1 and device 2, for instance.

When the validity period of the shared key has expired, certificate authentication unit 101 stops the current processing, and stays on standby for a new authentication request from device 2. Alternatively, certificate authentication unit 101 may transmit a new authentication request to device 2 by using the current public key certificate 122. When the validity period has not expired, shared key authentication unit 103 proceeds the processing to step S303. In step S303, shared key authentication unit 103 generates arbitrary random number A, and transmits the random number A to device 2 via communication unit 11.

In step S304, shared key authentication unit 203 encrypts random number A transmitted from controller 1 and obtained via communication unit 21, using the shared key, and calculates encrypted random number a. In addition, shared key authentication unit 203 generates arbitrary random number B. In step S305, shared key authentication unit 203 transmits the calculated encrypted random number a and the generated random number B to controller 1 via communication unit 21.

In step S306, shared key authentication unit 103 obtains the encrypted random number a and random number B transmitted from device 2 via communication unit 11, and decrypts the encrypted random number a using the shared key. When a decryption result matches random number A, verification of random number A is successful, and shared key authentication unit 103 proceeds the processing to step S307, and when the decryption result does not match random number A, shared key authentication unit 103 completes the processing.

In step S307, shared key authentication unit 103 encrypts random number B transmitted from device 2 using the shared key, and calculates encrypted random number b.

In step S308, shared key authentication unit 103 generates a group key when necessary. The group key can use the key length of 128 bits of AES, for instance. Alternatively, shared key authentication unit 103 refers to registration information 123 and obtains a group key already generated. In step S309, shared key authentication unit 103 generates a session key. The session key can use the key length of 128 bits of AES, for instance.

In step S310, shared key authentication unit 103 sets a predetermined session validity period (for instance, 24 hours, 72 hours, etc.). In step S311, shared key authentication unit 103 encrypts the group key and the session key obtained in step S308 and step S309 using the shared key. It is to be noted that the processing in step S308 to step S311 is performed when a group key and a session key need to be generated for communication, and may be omitted.

In step S312, shared key authentication unit 103 transmits the encrypted random number b, the encrypted group key and session key, and the session validity period to device 2 via communication unit 11. Communication unit 21 of device 2 receives the encrypted random number b, the encrypted group key and session key, and the session validity period transmitted from controller 1.

In step S313, shared key authentication unit 203 decrypts the encrypted random number b obtained from communication unit 21 using the shared key. When a decryption result matches random number B, verification of random number B is successful, and shared key authentication unit 203 proceeds the processing to step S314, and when the decryption result does not match random number B, shared key authentication unit 203 completes the processing.

In step S314, shared key authentication unit 203 decrypts the encrypted group key and session key using the shared key. In step S315, shared key authentication unit 203 transmits to controller 1 a notification of success for notifying that verification of random number B is successful.

Processing when Validity Period has Expired

Figure 10:
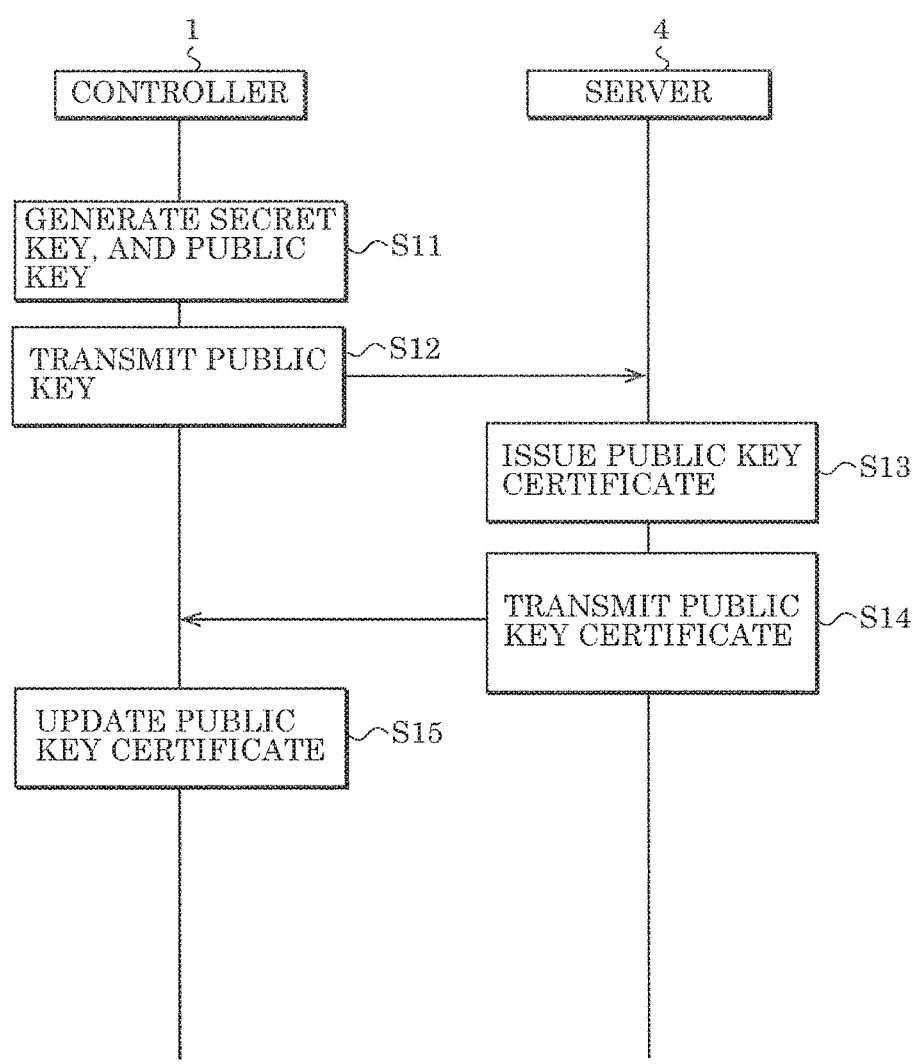
FIG. 10 is a sequence diagram illustrating the processing of update of a public key certificate in the authentication system according to the embodiment of the present invention.

An example of another processing when the validity period has expired as a result of checking the validity period of the shared key in step S301 and step S302 in the sequence diagram of FIG. 9 will be described with reference to the sequence diagram of FIG. 10.

In step S11, update processor 104 generates a new public key corresponding to new secret key 121 and new secret key 121. In step S12, update processor 104 transmits the generated new public key to server 4 via communication unit 11.

In step S13, server 4 receives the public key transmitted in step S12, affixes the signature of server 4 to the public key, and issues new public key certificate 122. In step S14, server 4 transmits new public key certificate 122 to controller 1.

In step S15, update processor 104 receives new public key certificate 122 transmitted in step S14, and replaces public key certificate 122 already stored in memory 12 with new public key certificate 122 to be stored. In this manner, controller 1 performs mutual authentication with device 2 using new valid public key certificate 122, and can generate a shared key with a new validity period set.

With the authentication system according to this embodiment, setting the validity period of public key certificate 122 or public key certificate 222 in a shared key allows mutual authentication to be performed with the shared key in consideration of the validity period of the public key certificates, and thus the safety and reliability of communication can be improved.

In addition, with the authentication system according to this embodiment, the safety and reliability of communication can be further improved by setting the shorter one of the validity periods of public key certificate 122 and public key certificate 222 in the shared key.

In addition, with the authentication system according to this embodiment, checking of the validity period every session update allows the efficiency in detecting an invalid shared key to be improved, and thus the safety and reliability of communication can be further improved.

Support of Legacy Device

In practical operational environment, devices that support and devices that do not support the above-described mutual authentication (hereinafter referred to as "device authentication") using an electronic certificate are mixed. Even in such an environment, it is desirable that the devices not supporting the device authentication be safely operated.

Hereinafter, a communication system according to this embodiment will be described. In the following description, a device supporting the mutual authentication is referred to as an "authentication support device", and a device not supporting the mutual authentication is referred to as a "legacy device". The device authentication is as described in <<Basic Configuration>>.

Communication System

Figure 11:
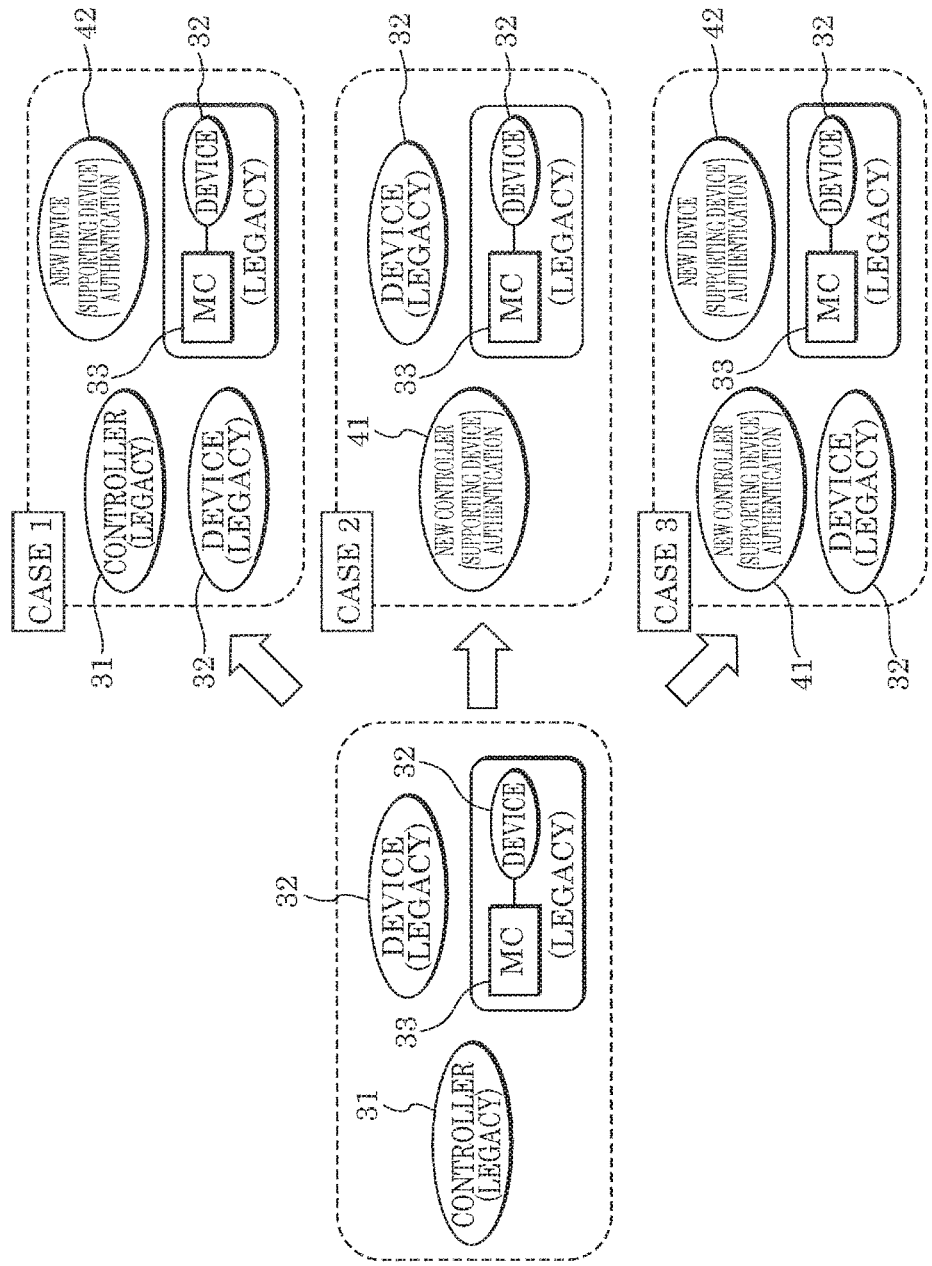
FIG. 11 is a conceptual diagram for explaining a case where support for a legacy device is necessary in a communication system according to the embodiment of the present invention.

FIG. 11 is a conceptual diagram for explaining a case where support for a legacy device is necessary in the communication system according to this embodiment. Here, as illustrated on the left side of FIG. 11, a case is assumed where a communication system includes only legacy devices, such as controller (legacy) 31, device (legacy) 32, and media converter (legacy) 33.

In such a communication system, case 1 indicates a case where new device (supporting the device authentication) 42 is newly introduced. It is prohibited to operate new device 42 (supporting the mutual authentication) from controller (legacy) 31, thus a problem arises in that the newly introduced new device (supporting the device authentication) 42 cannot be operated. To cope with this problem, the firmware of controller (legacy) 31 may be updated or replaced.

Next, case 2 indicates a case where new controller (supporting the device authentication) 41 is newly introduced. Although new controller (supporting the device authentication) 41 supports the device authentication, a legacy device such as device (legacy) 32 does not support the device authentication. Therefore, mutual authentication between new controller (supporting the device authentication) 41 and device (legacy) 32 will fail. That is, a problem arises in that a legacy device cannot be operated from newly introduced new controller (supporting the device authentication) 41. To cope with this problem, the operation of a legacy device by new controller (supporting the device authentication) 41 may be conditionally permitted (which will be described later).

Lastly, case 3 indicates a case where new device (supporting the device authentication) 42 and new controller (supporting the device authentication) 41 are newly introduced. Since a legacy device, such as device (legacy) 32 is mixed also in case 3, the same problem arises as in case 2.

New Controller

Figure 12:
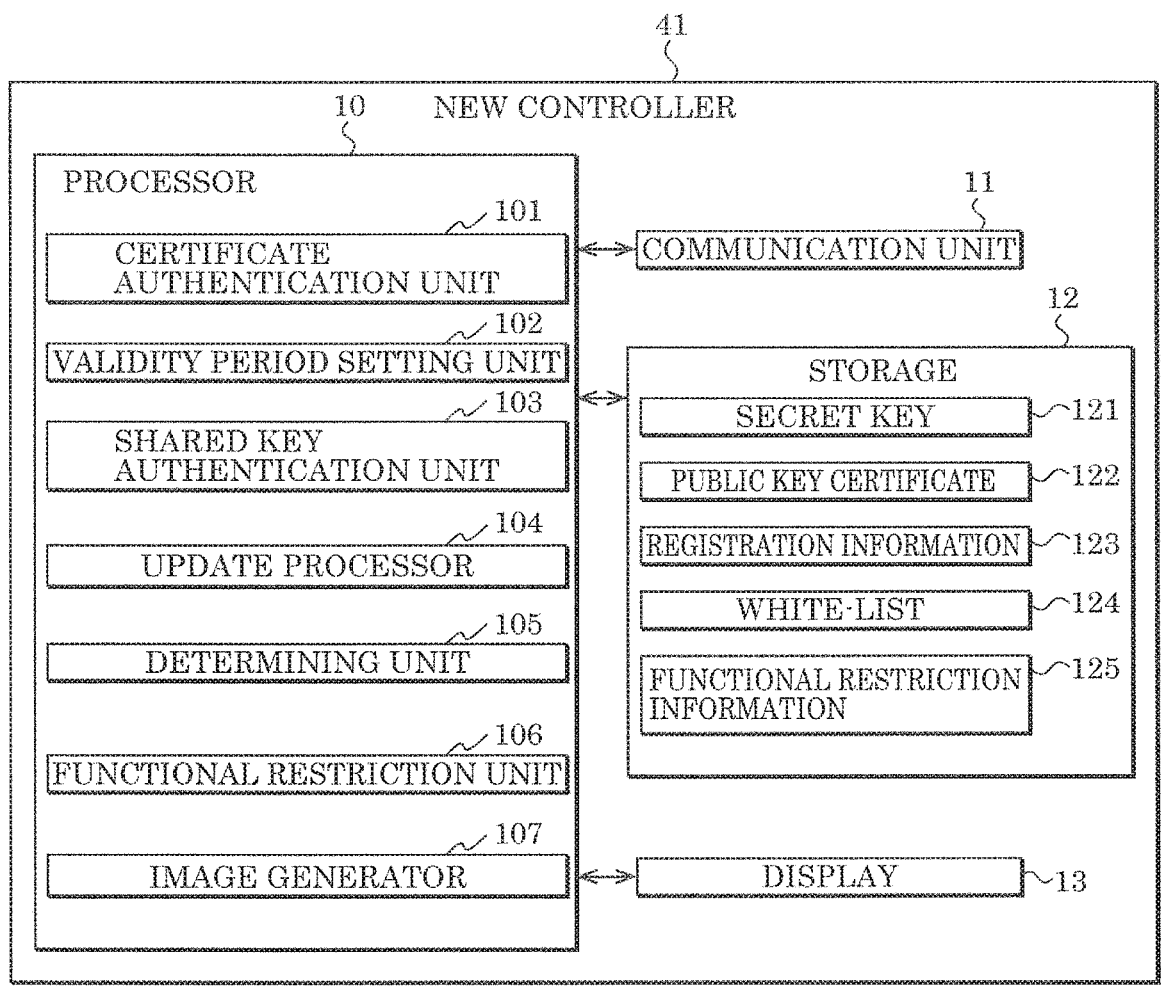
FIG. 12 is a block diagram illustrating the fundamental configuration of a new controller (supporting the device authentication) included in the communication system according to the embodiment of the present invention.

FIG. 12 is a block diagram illustrating the fundamental configuration of new controller (supporting the device authentication) 41 included in the communication system according to this embodiment. New controller (supporting the device authentication) 41 is a controller which performs encrypted communication with a device which has succeeded in mutual authentication using an electronic certificate, and the controller includes processor 10, communication unit 11, memory 12, and display 13 as illustrated in FIG. 12. Processor 10 includes determining unit 105, functional restriction unit 106, and screen generator 107. Memory 12 includes whitelist 124 and functional restriction information 125.

Determining unit 105 determines whether or not a communication target device with which communication is to be performed is an authentication support device. When the communication target device is determined not to be an authentication support device by determining unit 105, functional restriction unit 106 imposes restrictions on the functions operable from new controller (supporting the device authentication) 41 among the functions of the communication target device. Communication unit 11 performs communication with the communication target device in an unencrypted form under the functional restriction imposed by functional restriction unit 106. Thus, a legacy device and new controller (supporting the device authentication) 41 are connected, and the operation of the legacy device by new controller (supporting the device authentication) 41 can be conditionally permitted.

Screen generator 107 generates various screens. Display 13 is a display device that displays various screens generated by screen generator 107. Whitelist 124 is an authorization list in which information (such as a manufacturer, and a model number) on devices in conformity with a specific standard such as AIF is listed. Functional restriction information 125 is information that defines functional restriction with different levels of tightness according to stepwise security levels, and the information is referred to by functional restriction unit 106. Each of other processors is as described in <<Basic Configuration>>.

It is to be noted that new controller (supporting the device authentication) 41 and display 13 may not be integrated. In other words, display 13 may be a display device capable of communicating with new controller (supporting the device authentication) 41, and may be, for instance, a separate terminal, such as a smartphone.

AIF

An air conditioner, an illuminator, a storage battery, a water heater, an electric vehicle charger/discharger, a fuel cell, solar power generation, and a smart meter are placed as devices for which interconnection is more important in HEMS. AIF (Application Interface) is a specification that defines the usage of such important devices at the application level of ECHONET-Lite for improvement of interconnectivity.

It can be stated that a device supporting the AIF has a higher authentication function than a legacy device in conformity with universal ECHONET-Lite standard does. Therefore, the functional restriction for a device supporting the AIF is more relaxed than the functional restriction for a legacy device.

Specifically, when the communication target device is determined not to be an authentication support device, determining unit 105 further determines whether the communication target device is an authorized device matching one type in the authorization list (whitelist 124) or an unauthorized device (legacy device) not matching any type in the authorization list. In this manner, when the communication target device is determined to be an authorized device by determining unit 105, less functional restriction can be imposed, as compared with the case where the communication target device is determined to be an unauthorized device.

Connection Example

Figure 13:
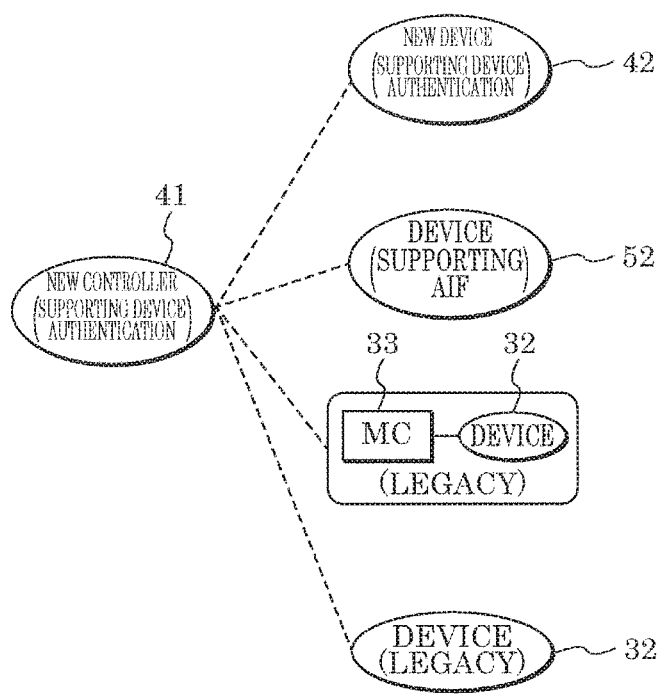
FIG. 13 is a block diagram illustrating an example of connection between another device and the new controller (supporting the device authentication) included in the communication system according to the embodiment of the present invention.

Hereinafter, the configuration of new controller (supporting the device authentication) 41 along with its operation will be described. Here, as illustrated in FIG. 13, an environment is assumed, in which various devices, such as new device (supporting the device authentication) 42, device (supporting AIF) 52, and device (legacy) 32, are present in an intermingled manner. Also, it is assumed that device authentication is performed by a trigger of button press.

Figure 14:
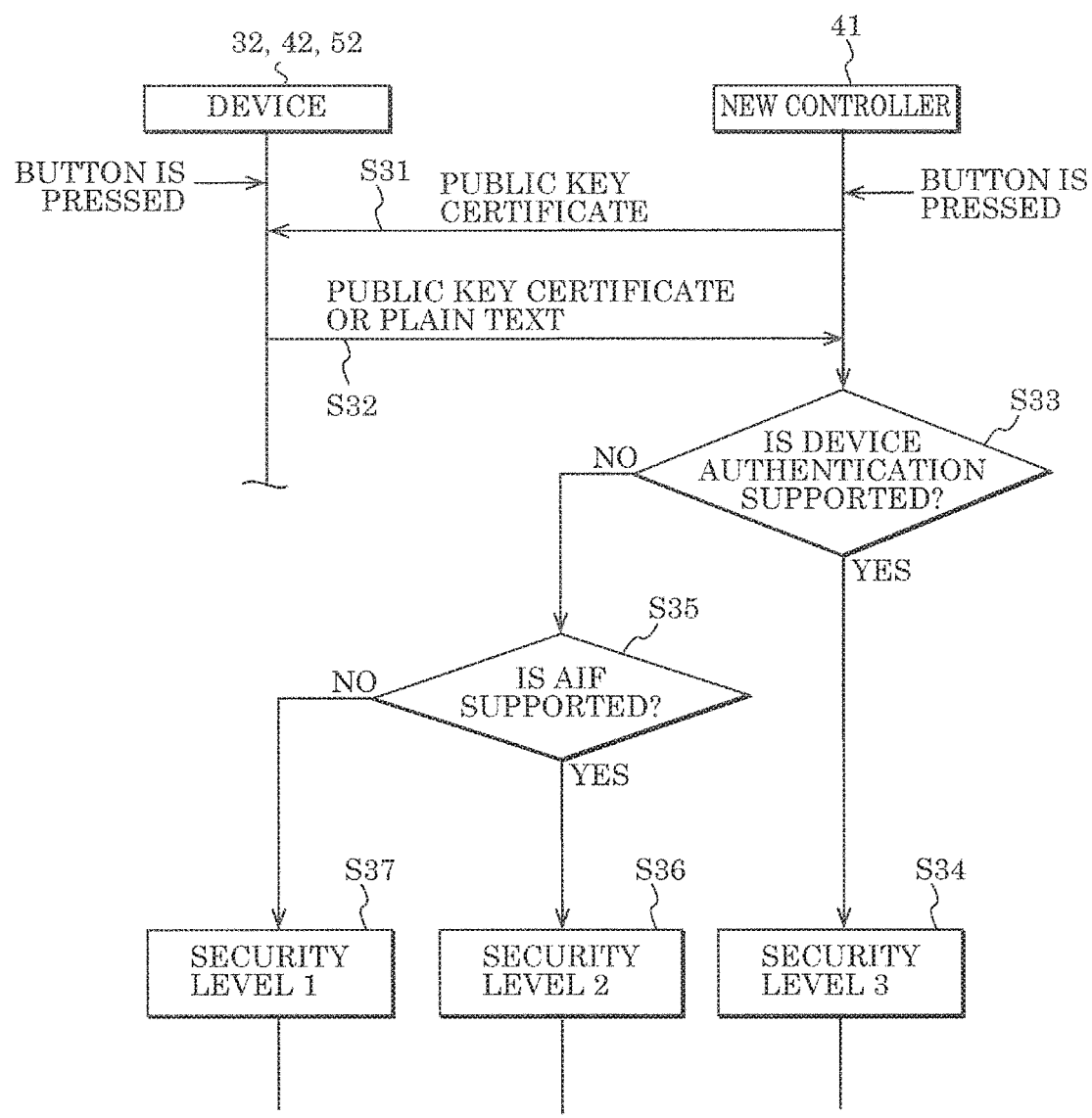
FIG. 14 is a flowchart illustrating the operation of the new controller (supporting the device authentication) included in the communication system according to the embodiment of the present invention.

First, a user is assumed to press the buttons of new controller (supporting the device authentication) 41 and new device (supporting the device authentication) 42. Thus, new controller (supporting the device authentication) 41 performs device authentication with new device (supporting the device authentication) 42, thereby determining whether or not new device 42 is an authentication support device (step S31→S32→S33 in FIG. 14). When receiving device ID and public key certificate 222 from new device (supporting the device authentication) 42, new controller 41 determines that new device 42 is an authentication support device (YES in step S33 in FIG. 14). When new device 42 is determined to be an authentication support device like this, the security level is determined to be "3" (step S34 in FIG. 14), and new controller 41 is connected to new device (supporting the device authentication) 42 as in the normal manner. In this case, connection can be made safely by encrypted communication.

Next, a user is assumed to press the buttons of new controller (supporting the device authentication) 41 and device (supporting the AIF) 52. Thus, new controller (supporting the device authentication) 41 performs device authentication with device (supporting the AIF) 52, thereby determining whether or device 52 is an authentication support device (step S31→S32→S33 in FIG. 14). When receiving a plain text from device (supporting the AIF) 52, new controller 41 determines that device 52 is not an authentication support device (NO in step S33 in FIG. 14). That is, when a plain text (a packet in conformity with ECHONET) is received at the start of mutual authentication, determination is made such that device 52 is not an authentication support device. When device 52 is determined not to be an authentication support device like this, new controller 41 further determines whether or not device 52 is an authorized device (supporting the AIF) matching one type in whitelist 124 (step S35 in FIG. 14). The determination as to whether device 52 supports AIF is made based on a packet in conformity with ECHONET received from device (supporting the AIF) 52. At this point, if it is not possible to determine that device 52 supports the AIF, further information may be obtained from device (supporting the AIF) 52. Since device (supporting the AIF) 52 matches one type in whitelist 124, device 52 is determined to be an authorized device (supporting the AIF) (YES in step S35 in FIG. 14). When device 52 is determined to be an authorized device (supporting the AIF) like this, the security level is determined to be "2" (step S36 in FIG. 14), and new controller 41 is connected to device (supporting the AIF) 52 with confirmation by a user. It is to be noted that in this case, new controller 41 is connected to device (supporting the AIF) 52 with functional restriction.

Next, a user is assumed to press the buttons of new controller (supporting the device authentication) 41 and device (legacy) 32. Thus, new controller (supporting the device authentication) 41 performs device authentication with device (legacy) 32, thereby determining whether or not device 32 is an authentication support device (step S31→S32→S33 in FIG. 14). When a plain text is received from device (legacy) 32, device 32 is determined not to be an authentication support device (NO in step S33 in FIG. 14), it is further determined whether or not device 32 is an authorized device (supporting the AIF) matching one type in whitelist 124 (step S35 in FIG. 14). Since device (legacy) 32 does not match any type in whitelist 124, device 32 is determined not to be an authorized device (supporting the AIF) (NO in step S35 in FIG. 14). When device 32 is determined not to be an authorized device (supporting the AIF) like this, the security level is determined to be "1" (step S37 in FIG. 14), and new controller 41 is connected to device (legacy) 32 with confirmation by a user.

As described above, in the communication system according to this embodiment, a stepwise security level is determined, and functional restriction with a different level of tightness is imposed according to the stepwise security level. Consequently, even in an environment in which devices supporting the device authentication and devices not supporting the device authentication are present in an intermingled manner, the devices not supporting the device authentication can be safely operated.

When a problem arises in a period (operational matter) of connection to device (legacy) 32 and device (supporting the AIF) 52, connection may be cut off from new controller (supporting the device authentication) 41. In other words, even if functional restriction and user confirmation are provided, when restriction is not allowed for a predetermined period, the connection is supposed to be cut off. Consequently, the devices not supporting the device authentication can be more safely operated.

Screen Example

FIG. 15 is a diagram illustrating a screen example displayed on display 13 of new controller (supporting the device authentication) 41. As already described, when connection to device (legacy) 32 or device (supporting the AIF) 52 is made, a user is asked if connection to these devices is permitted. For instance, when device (supporting the AIF) 52 is air conditioner B, as illustrated in FIG. 15, a message such as "Air conditioner B does not support new connection method. Would you like air conditioner B to be connected?" may be displayed on display 13, and "YES" or "NO" may be selected by a user. When "YES" is selected on confirmation screen 13A, communication with device (supporting the AIF) 52 is performed.

Specifically, since device (legacy) 32 and device (supporting the AIF) 52 do not support the device authentication, an error is received from new controller (supporting the device authentication) 41, or timeout occurs after a certain period of time. Even in this case, confirmation screen 13A may be popped up on display 13 of new controller (supporting the device authentication) 41, and device (legacy) 32 and device (supporting the AIF) 52 can be connected to new controller (supporting the device authentication) 41 after check by a user.

Here, although a user is asked if connection to the devices is permitted, the confirmation screen is not limited to this. For instance, a message prompting to update or exchange the firmware of device (legacy) 32 or device (supporting the AIF) 52 may be displayed on display 13. Thus, when device (legacy) 32 or device (supporting the AIF) 52 is replaced with new device (supporting the device authentication) 42, connection can be made safely by encrypted communication.

FIG. 16 is a diagram illustrating another screen example displayed on display 13 of new controller (supporting the device authentication) 41. As illustrated in FIG. 16, confirmation screen 13B for checking the list of functional restriction imposed by functional restriction unit 106 may be displayed on display 13. The list of such functional restriction can be generated based on functional restriction information 125. Here, a case is exemplified in which "security level", "functional restriction", and "device deletion" are associated with each device. In confirmation screen 13B, it is also possible to change (including releasing) "functional restriction" based on user responsibility. When "functional restriction" is changed by a user, communication is performed with the functional restriction after changed.

Functional Restriction Information

FIG. 17 is a diagram illustrating an example of functional restriction information 125 stored in memory 12 of new controller (supporting the device authentication) 41. Functional restriction information 125 is a table that defines functional restriction with different levels of tightness according to stepwise security levels. Functional restriction information 125 is defined for each of devices such as, an air conditioner, a storage battery, solar power generation, and an instantaneous water heater. In this manner, new controller (supporting the device authentication) 41 can achieve functional restriction according to the characteristics of each device.

As illustrated in FIG. 17, "functional restriction imposed" for the case of security level 1, "partial functional restriction imposed" for the case of security level 2, and "no functional restriction imposed" for the case of security level 3. Specifically, in the case of security level 1, new controller (supporting the device authentication) 41 permits only an acquisition command for fundamental information (operating state and setting information). Also, in the case of security level 2, new controller (supporting the device authentication) 41 permits operation-related and setting-related partial commands in addition to the commands in the case of security level 1. However, acquisition of information on billing and privacy, and setting and changing of a driving operational state are prohibited. This is because in the case other than the security level 3 (the case not supporting the device authentication), there is a possibility of falsification of a command. Hereinafter, the functional restriction will be described in more detail for each of devices such as, an air conditioner, a storage battery, solar power generation, and an instantaneous water heater.

For an air conditioner, in the case of security level 1, new controller (supporting the device authentication) 41 permits acquisition of information only, and prohibits all operation-related commands. Also, in the case of security level 2, not unsafe temperature setting in the upper and lower limit temperature range is permitted.

For a storage battery, in the case of security level 1, new controller (supporting the device authentication) 41 permits acquisition of fundamental information only, and prohibits acquisition of electric energy information on operation-related or billing such as power purchase and sale. Also, in the case of security level 2, an unsafe operation and an operation which may have an effect on the power system are prohibited.

For solar power generation, in the case of security level 1, new controller (supporting the device authentication) 41 permits acquisition of fundamental information only. Also, in the case of security level 2, acquisition of an integrated generated electric energy measurement value related to billing is prohibited.

For an instantaneous water heater, in the case of security level 1 as well as security level 2, new controller (supporting the device authentication) 41 permits acquisition of fundamental information only, and prohibits bath automatic mode setting which may allow an operation of a water heater not intended by a user.

As described above, new controller (supporting the device authentication) 41 included in the communication system according to this embodiment is a controller which performs encrypted communication with a device which has succeeded in mutual authentication using an electronic certificate, and the controller includes determining unit 105, functional restriction unit 106, and communication unit 11. Determining unit 105 determines whether or not a communication target device is an authentication support device that supports the mutual authentication. When the communication target device is determined not to be an authentication support device by determining unit 105, functional restriction unit 106 imposes restrictions on the functions operable from new controller (supporting the device authentication) 41 among the functions of the communication target device. Communication unit 11 performs communication in plain text with the communication target device under the functional restriction imposed by functional restriction unit 106. Consequently, even in an environment in which devices supporting the device authentication and devices not supporting the device authentication are present in an intermingled manner, the devices not supporting the device authentication can be safely operated.

Also, when the communication target device is determined not to be an authentication support device, determining unit 105 may further determine whether the communication target device is an authorized device matching one type in whitelist 124 or a legacy device not matching any type in whitelist 124. When the communication target device is determined to be an authorized device by determining unit 105, functional restriction unit 106 may impose less functional restrictions, as compared with the case where the communication target device is determined to be a legacy device. Thus, for instance the functional restrictions for a device supporting the AIF can be more relaxed than the functional restrictions for a legacy device.

Also, when the communication target device is determined to be a legacy device by determining unit 105, functional restriction unit 106 may permit only an acquisition command for an operational state and setting information. This allows to reduce the possibility of damage to the legacy device as much as possible.

Also, when the communication target device is determined to be an authorized device by determining unit 105, in addition to an acquisition command for an operational state and setting information, functional restriction unit 106 may permit operation-related and setting-related commands (however, acquisition of information on billing and privacy, and setting and changing of a driving operational state are excluded). This allows to reduce the possibility of damage to the authorized device and to utilize a command according to the characteristics of the authorized device.

In addition, when the communication target device is determined not to be an authentication support device by determining unit 105, confirmation screen 13A may be displayed on display 13 capable of communicating with new controller (supporting the device authentication) 41 to ask a user whether connection to the communication target device is permitted. This allows connection to the communication target device to be permitted with confirmation by a user, and thus it is possible to avoid inconvenience of functional restrictions imposed more than necessary.

In addition, confirmation screen 13B may be displayed on display 13 capable of communicating with new controller (supporting the device authentication) 41 to change the functional restrictions imposed by functional restriction unit 106. This allows the functional restrictions to be changed (including released) with confirmation by a user, and thus it is possible to avoid inconvenience of functional restrictions imposed more than necessary.

Also, when a packet in conformity with ECHONET is received at the start of mutual authentication, determining unit 105 may determine that the communication target device is not the authentication support device. Thus, it is possible to determine whether the communication target device is an authentication support device reliably and easily.

It is to be noted that in the above description, one of three-staged security levels is determined according to whether the communication target device is an authentication support device, an authorized device, or a legacy device. However, the security levels may be in two stages or more. When some functional restrictions are imposed, the same effect is obtained excluding the case of the highest security level.

Although a device supporting the AIF has been exemplified as an authorized device, as long as a device is in conformity with a certain standard, the device can be adopted as an authorized device. When multiple types of authorized devices are adopted, different security levels may be set for the authorized devices. In this case, needless to say, functional restriction with different levels of tightness may be imposed according to the different security levels for the authorized devices.

Although confirmation screen 13A is displayed when connection is made to device (legacy) 32 and device (supporting the AIF) 52 (see FIG. 15), different confirmation screens may be displayed for the case of connection to device (legacy) 32 and the case of connection to device (supporting the AIF) 52. This makes it more difficult for a user to permit connection for a lower security level.

Also, when a packet in conformity with ECHONET is received at the start of the mutual authentication, determining unit 105 is supposed to determine that the communication target device is not the authentication support device. However, the timing of determination and the method of determination as to the authentication support device are not particularly limited. For instance, when device (legacy) 32 or device (supporting the AIF) 52 is in conformity with a standard other than ECHONET, it is sufficient to determine whether a packet in conformity with the standard other than ECHONET is received.

Also, the invention can be implemented not only as new controller (supporting the device authentication) 41, but also as a communication method including steps corresponding to characteristic processors included in new controller (supporting the device authentication) 41, and as a communication program that causes a computer to execute those steps. Needless to say, such a program can be distributed via a recording media, such as a CD-ROM and a transmission medium, such as the Internet.

Other Embodiments

Although the embodiment has been described above, it should be understood that the discussions and drawings that form part of the disclosure do not limit the embodiment. Various alternative embodiments, examples, and operational techniques will be apparent to those skilled in the art from the disclosure.

For instance, in the embodiment already described, the sequence diagrams of FIGS. 7 to 10 may be modified so that even when controller 1 and device 2 are reversed, the same processing can be performed.

Needless to say, in addition to the above embodiment, the invention may include various embodiments which are not described here. Therefore, the technical scope of the present embodiment is defined only by the invention specific matter related to the appended claims, reasonably inferred from the above description.

The invention claimed is:

1. Control circuitry which performs encrypted communication with a device which has succeeded in mutual authentication using an electronic certificate, the control circuitry comprising:
    a determining unit which:
        determines whether or not a communication target device with which communication is to be performed is an authentication support device that supports the mutual authentication; and
        determines whether or not the communication target device is an authorized device when the communication target device is not the authentication support device;
    a functional restriction unit which:
        imposes a functional restriction on one or more functions of the communication target device when the communication target device is determined not to be the authorized device, wherein the functional restriction comprises permitting only an acquisition command for an operational state and setting information of the communication target device; and
        permits, in addition to the acquisition command for the operational state and setting information, operation-related and setting-related commands of the communication target device, the operation-related and setting-related commands excluding acquisition of information on billing and privacy, and setting and changing of a driving operational state when the communication target device is determined to be the authorized device; and
    a communication unit which:
        performs communication in plain text with the communication target device with the functional restriction imposed by the functional restriction unit when the communication target device is determined not to be the authentication support device.

2. The control circuitry according to claim 1,
    wherein the determining unit determines whether the communication target device is the authorized device when matching one type in an authorization list or the unauthorized device when not matching any type in the authorization list, and
    when the communication target device is determined to be the authorized device by the determining unit, the functional restriction unit imposes less functional restriction on the communication target device, as compared to when the communication target device is determined to be the unauthorized device.

3. The control circuitry according to claim 1,
    wherein when the communication target device is determined not to be the authentication support device by the determining unit, a confirmation screen is displayed on a display capable of communicating with the control circuitry to further ask a user whether connection to the communication target device is permitted.

4. The control circuitry according to claim 1,
    wherein a confirmation screen is displayed on a display capable of communicating with the control circuitry to further change the functional restriction imposed by the functional restriction unit.

5. The control circuitry according to claim 1,
    wherein when a packet in conformity with ECHONET is received at start of the mutual authentication, the determining unit determines that the communication target device is not the authentication support device.

6. A communication method performed by a control circuitry when the control circuitry performs encrypted communication with a device which has succeeded in mutual authentication using an electronic certificate, the method comprising:
    determining by the control circuitry whether or not a communication target device with which communication is to be performed is an authentication support device that supports the mutual authentication;
    determining whether or not the communication target device is an authorized device when the communication target device is not the authentication support device;
    when the communication target device is determined not to be the authorized device, imposing a functional restriction on one or more functions of the communication target device which are operable by the control circuitry, wherein the functional restriction comprises permitting only an acquisition command for an operational state and setting information of the communication target device;
    when the communication target device is determined to be the authorized device, permitting, in addition to the acquisition command for the operational state and setting information, operation-related and setting-related commands of the communication target device, the operation-related and setting-related commands excluding acquisition of information on billing and privacy, and setting and changing of a driving operational state when the communication target device is determined to be the authorized device; and
    when the communication target device is determined not to be the authentication support device, performing communication in plain text with the communication target device with the functional restriction in the imposing.

7. The communication method according to claim 6, further comprising
when the communication target device is determined not to be the authentication support device in the determining, displaying a confirmation screen on a display capable of communicating with the control circuitry to ask a user whether connection to the communication target device is permitted.

8. The communication method according to claim 6, further comprising
displaying a confirmation screen on a display capable of communicating with the control circuitry to change the functional restriction in the imposing.

9. A communication system including a control circuitry which performs encrypted communication with a device which has succeeded in mutual authentication using an electronic certificate,
the control circuitry comprising:
a determining unit which:
determines whether or not a communication target device with which communication is to be performed is an authentication support device that supports the mutual authentication; and
determines whether or not the communication target device is an authorized device when the communication target device is not the authentication support device;

a functional restriction unit which:
imposes a functional restriction on one or more functions of the communication target device when the communication target device is determined not to be the authorized device, wherein the functional restriction comprises permitting only an acquisition command for an operational state and setting information of the communication target device; and
permits, in addition to the acquisition command for the operational state and setting information, operation-related and setting-related commands of the communication target device, the operation-related and setting-related commands excluding acquisition of information on billing and privacy, and setting and changing of a driving operational state when the communication target device is determined to be the authorized device; and a communication unit which:
performs communication in plain text with the communication target device with the functional restriction imposed by the functional restriction unit when the communication target device is determined not to be the authentication support device.

* * * * *